United States Patent [19]

Jankowski et al.

[11] 3,911,430

[45] Oct. 7, 1975

[54] ALPHA-NUMERIC DISPLAY PACKAGE

[75] Inventors: Alfred S. Jankowski, San Jose; John L. Moll, Palo Alto, both of Calif.

[73] Assignee: Fairchild Camera and Instrument Corporation, Mountain View, Calif.

[22] Filed: Apr. 17, 1974

[21] Appl. No.: 461,561

[52] U.S. Cl. .......................... 340/378 R; 340/366 R

[51] Int. Cl.$^{2}$ .......................... G08B 5/36

[58] Field of Search ............ 340/336, 378 R, 366 R, 340/324 R; 313/498, 499

[56] References Cited

UNITED STATES PATENTS

| | | | |
|---|---|---|---|
| 3,676,668 | 7/1972 | Collins | 313/499 X |
| 3,760,237 | 9/1973 | Jaffe | 313/499 X |
| 3,780,357 | 12/1973 | Haitz | 313/498 X |
| 3,786,499 | 1/1974 | Jankowski | 340/366 |

*Primary Examiner*—Harold I. Pitts
*Attorney, Agent, or Firm*—Roger S. Borovoy; Alan H. MacPherson

[57] ABSTRACT

A package for displaying alpha-numeric characters using a plurality of discrete, light-emitting diodes, each diode having a light-emitting surface providing a point source of light corresponding to a segment of the characters when electrically activated, including a lead frame, a plurality of light-emitting diodes in the general shape of the necessary character segments arranged laterally on a supporting portion of a lead frame. The package includes a block of translucent material, part of which is beneath and supporting the lead frame and the diodes, and another part of which overlies and is bonded to the diodes and to the supporting portion of the lead frame to maintain the diodes rigidly positioned in the frame. Included are a plurality of translucent lenses formed integral with the translucent supporting material, one lens aligned with each diode, and a plurality of light pipes, one for each diode, which project the light up to a protective cover which forms the entire package.

3 Claims, 5 Drawing Figures

ALPHA-NUMERIC DISPLAY PACKAGE

FIELD OF THE INVENTION

This invention is in the field of packages for solid state displays. More specifically, the packages of this invention are used for hybrid circuits including a plurality of light-emitting diodes, mounted on a base, including the necessary portions of the package to display the emitted light in the form of an alpha-numeric character.

PRIOR ART

Packages of the same general type as the one of this invention are known, and have been described in U.S. Pat. No. 3,786,499 assigned to the same assignee as the subject invention. Such packages generally employ a substrate, a metal lead frame, and a plurality of light pipes having substantially parallel interior portions, one light pipe being aligned with each light-emitting diode. The light from an activated diode is passed through the light pipe and lights up the translucent material of the plastic cover of the display device, displaying the selected digit segment. Various segments are lighted simultaneously to display the desired character. The primary difficulty with these prior art packages is that a limited amount of light can be transmitted from each tiny, light-emitting diode. Accordingly, an improved package has been developed herein to substantially increase light transmission efficiency.

BRIEF DESCRIPTION OF THE INVENTION

Briefly, the invention is an improved package for selectively displaying one of a plurality of alpha-numeric characters using a plurality of light-emitting diodes, each diode having a light-emitting surface providing a source of light corresponding to a segment of the characters when electrically activated. The package of this invention includes a lead frame having a supporting portion; a plurality of light-emitting diodes in the general shape of the necessary segments of all the alpha-numeric characters to be displayed, arranged laterally on the supporting portion of the lead frame; a block of plastic material, a first portion of which is beneath and supportive of the supporting portion of the lead frame beneath the diodes, and a second translucent portion of which overlies and is bonded to the diodes and to the part of the supporting portion of the lead frame which surrounds the diodes, thereby maintaining the diodes rigidly positioned on the lead frame; a plurality of translucent lenses formed integral with and of the same material as the second portion of the block of material, one lens being aligned with and adjacent to the light-emitting surface of each of the diodes; a plurality of light pipes, one above each diode, for transmitting light therethrough; and a protective cover enclosing all of the diodes, the supporting portion of the lead frame, and at least part of the block of translucent material, thus making a complete enclosure for the diodes.

While structures of the same general type were described in the above-mentioned patent, this invention provides dramatic improvement in light transmission without adding cost to the package. While the concept of using conventional, separate lenses over light-emitting diodes is old, the idea of forming a plurality of such lenses unitary with the supporting block, and making both of the same plastic material was first invented here. However, it was found that while light emitted from the diodes at all angles is amplified by the lens, light emitted at a shallow incidence angle with the substrate is not sufficiently amplified by the lens to achieve maximum output luminance using conventional, parallel-sided light pipes. Such shallowly transmitted rays were severely attenuated by repeated reflection through the light pipes before the light reached the viewing surface of the package. This shallow-angled light bounces back and forth several times across the parallel sides of the prior art light pipes before reaching the viewing surface. Each bounce causes light attenuation. Thus, even though the shallow-angled light is amplified by the lens, its added brightness component is very limited.

It has now been discovered that if the sides of the light pipe are tapered, in accordance with a preferred embodiment of this invention, the number of back-and-forth reflections across the walls of the light pipe during transmission of shallow-angled beams is greatly lessened. Accordingly, the packages of a preferred embodiment of this invention have an outward taper in the light pipes, the smaller inside periphery of each pipe being located adjacent to the light-emitting diodes, and the larger inside periphery being located away from the diodes adjacent to the protective cover.

The improved packages of this invention have greatly enhanced performance with no additional cost of manufacture.

DETAILED DESCRIPTION OF THE INVENTION

Figure 1:
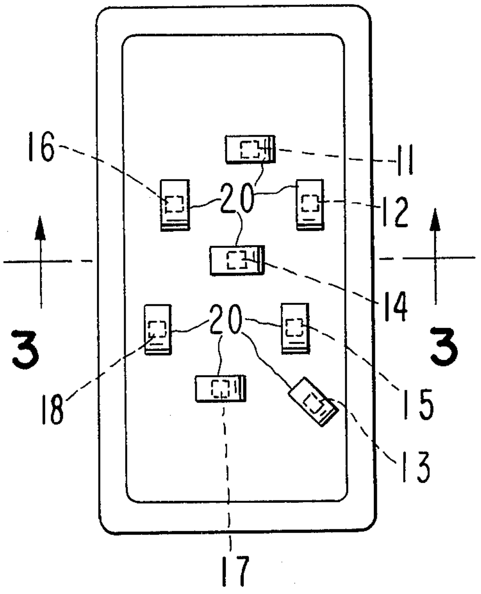
FIG. 1 is a top view of the substrate of the invention.
Figure 5:
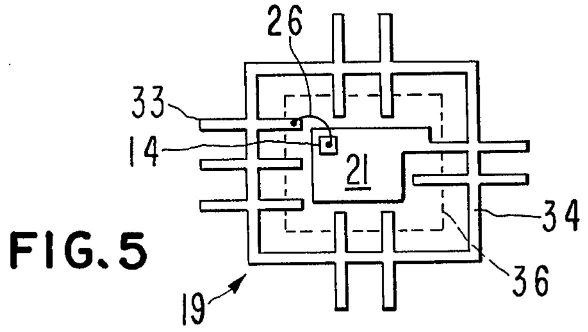
FIG. 5 shows a lead frame with one representative diode mounted and wired.

Referring to the drawings, and in particular to FIG. 1, each of the light-emitting diodes 11, 12, 13, 14, 15, 16, 17 and 18 are mounted with their light-emitting side up on a conductive lead frame 19 (shown separately in FIG. 5). These diodes are arranged laterally upon the substrate in the general shape of the necessary segments of all the alpha-numeric characters to be displayed. In the illustrated embodiment of the invention, the diodes are arranged to correspond with the segments of a figure "8" (shown in FIG. 2). As is well known in the art, a seven-segment figure "8", by the selective activation of two or more diodes, is sufficient to display all of the digits 0 through 9. Diode 13 is used to display the decimal point. This segment arrangement is conventional in the art, and needs no further explanation here.

Figure 3:
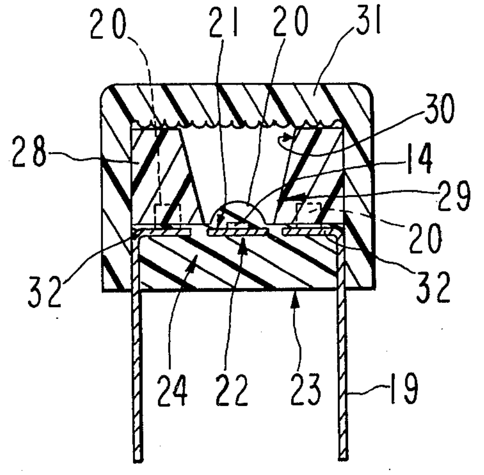
FIG. 3 is a cross-sectional view of the package of the invention taken along the lines 3—3 of FIG. 1.
Figure 4:
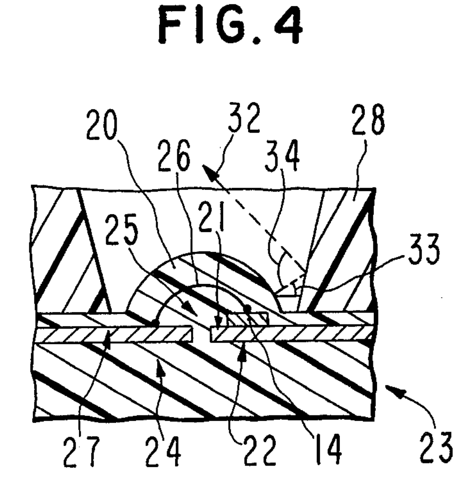
FIG. 4 is a detailed-blow-up of FIG. 3 showing the substrate, the supporting portion of the lead frame, the diode, the connecting wire, the plastic lens, and a portion of the light pipe associated with the diode.

Each of the diodes of this invention is aligned with and covered by a translucent lens 20 shown in FIGS. 1, 3 and 4. These lenses will be described in more detail, below.

Referring to FIGS. 3 and 4, a cross-section of the package of the invention is shown. This cross-section cuts through a single diode 14. This diode, and all of the other diodes in the package of the invention, are arranged in the general shape of the necessary segments of all of the alpha-numeric characters to be displayed. The diodes are arranged laterally on the supporting portion 22 of lead frame 19. In particular, diode 14 is mounted and electrically bonded to upper surface 21 of the supporting portion 22 of conductive lead frame 19.

Still referring to FIGS. 3 and 4, an essential aspect of the invention is that the second portion 25 of block 23 be a translucent material, such as clear plastic. A first portion 24 of block 23 is beneath and supportive of the supporting portion 22 of lead frame 19 beneath the diodes. This portion 24 may also be clear plastic if desired. A second portion 25 of block 23 overlies and is bonded to the diode and to the supporting portion 22 of lead frame 19, particularly in the area of surface 21 of the supporting portion 22 of frame 19 surrounding the diode 14. Thus the second translucent portion 25 of block 23 maintains the diodes rigidly positioned on the lead frame.

Referring to FIG. 4, wire 26 connects diode 14 to another portion 27 of the lead frame. This wire, bonded both to the diode and to the lead frame, makes the necessary electrical connection from the diode to lead which will protrude from the package. Since this wire is also enclosed and surrounded by the second portion 25 of block 23, the wire is also protected from breakage by the block 25 and is maintained permanently in a rigid position within the package.

Figure 2:
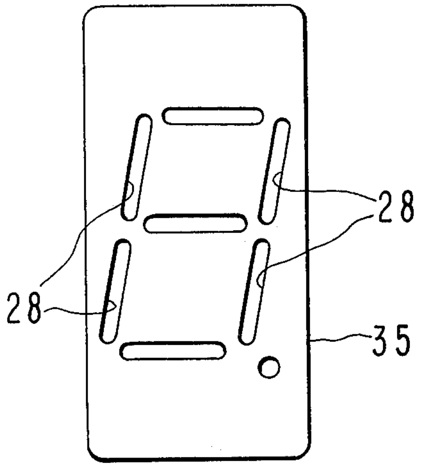
FIG. 2 is a top view of the block which contains the light pipes.

In accordance with a preferred embodiment of the invention, light pipes 28, shown in FIGS. 2, 3 and 4 have an outwardly tapered interior cross-section. Referring to FIG. 3, note that the interior walls of the illustrated light pipe 28 taper outwardly, the smaller inside periphery 29 of each light pipe being located adjacent to and aligned with the light-emitting diode 14 and the larger inside periphery 30 being located away from the diode and adjacent protective cover 31. Thus, as shown in FIG. 4 a light ray 32, having a shallow incidence angle 33 with the plane of the block 23 will be deflected at a greater angle, such as angle 34, than if the walls of the pipes were vertical. Such a ray will therefore encounter fewer bounces in its path towards the inner surface of the visible protective cover 31 (shown in FIG. 3). This greatly improves the ability of light emitted at a shallow angle from diode 14 through lens 20 to be visible to the eye when it reaches the protective cover.

Referring to FIG. 5, the package of the invention is manufactured in a simple way. Initially metal lead frame 19 is conventionally punched from Kovar, nickel, or other conventional materials in flat form, as shown. If desired, it may be plated with a noble or other metal. To hold the frame together, a tie bar 34 is added to the frame around the outer periphery. The frame has a central, supporting portion 21 to which the diodes, such as diode 14, illustrated, are bonded. After the diodes are mounted, wires, such as wire 26 shown as an example, are bonded from the top of each diode to one of the leads. Wire 26 is shown bonded to lead 33 of frame 19. All during this procedure, the frame is held integrally together by means of tie bar 34.

After all the diodes have been mounted and all of the necessary wires bonded, frame 19 is placed into a transfer mold where a translucent material, such as epoxy, silicone, or other plastic sufficient to form block 23 (FIG. 3) is molded all around the diodes, the supporting portion 22 (FIG. 3) of the lead frame (including surface 21 around the diodes) and the interior-extending ends of all the individual leads, such as lead 33 shown in FIG. 5. The approximate boundary of the block 23 which is to be molded around the frame 19 in FIG. 5 is shown by the dotted line 36.

During the molding, the translucent material is molded to conform to the shape of block 23 shown in FIG. 4, including the lower first portion 24 of the block beneath and supportive of the frame 19 and the upper portion 25 above and surrounding the frame 19 and the diodes and wires. In addition, during the same molding operation, the lenses 20 are formed by leaving appropriate cavities in the mold.

After molding, tie bar 34 shown in FIG. 5 is removed completely from between the leads so as to separate all the leads, such as lead 33, which are then substantially straight. These leads are then bent to form corners 32 as shown in FIG. 3.

Finally, to complete the assembly, light pipe assembly 35, shown in FIG. 2, is laid on top of the device as shown in FIG. 3 in proper alignment with the diodes 11–18 (FIG. 1) and the lenses 20. Finally, cap 31 shown in FIG. 3 is placed atop the entire unit and sealed to the leads and the translucent supporting block 23. If desired, a hermetic enclosure may be made.

We claim:

1. An improved package for selectively displaying one of a plurality of alpha-numeric characters using a plurality of light-emitting diodes, each diode having a light-emitting surface providing a point source of light corresponding to a segment of said characters when electrically activated, comprising:

a lead-frame having a supporting portion;

a plurality of light-emitting diodes in the general shape of the necessary segments of all the alpha-numeric characters to be displayed, arranged laterally on said supporting portion of said lead-frame;

a block of plastic material, a first portion of which is beneath and supportive of said supporting portion of said lead frame beneath said diodes, and a second translucent portion of which overlies and is bonded to said diodes and to the part of said supporting portion of said lead frame surrounding said diodes, thereby maintaining said diodes rigidly positioned on said lead frame;

a plurality of translucent lenses formed integral with and of the same material as said second portion of said block of material, one lens being aligned with and adjacent to the light-emitting surface of each of said diodes;

a plurality of light pipes, one above each diode, for transmitting light therethrough; and a protective cover enclosing all of said diodes, said supporting portion of said lead frame, and at least part of said block of translucent material, thus making a complete enclosure for said diodes.

2. The package of claim 1 further characterized by the addition of a wire bonded to each diode and to an electrically separate portion of said lead frame, said wire being enclosed and surrounded by said second portion of said block of translucent material, thereby protecting said wire from breakage and maintaining it permanently in a rigid position in said package.

3. The package of claim 1 further characterized by each of said light pipes being tapered outwardly, the smaller inside periphery of each pipe being located adjacent and aligned with said light-emitting surface of each of said diodes and its associated translucent lens, and the larger inside periphery at the outer portion of said taper being located away from said diode and adjacent said protective cover.

* * * * *